Dec. 18, 1945.   L. TARWATER ET AL   2,391,279
LOCK NUT
Filed Dec. 29, 1941
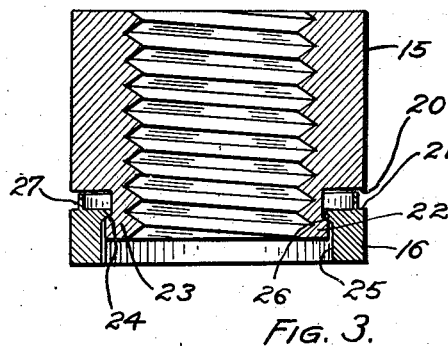
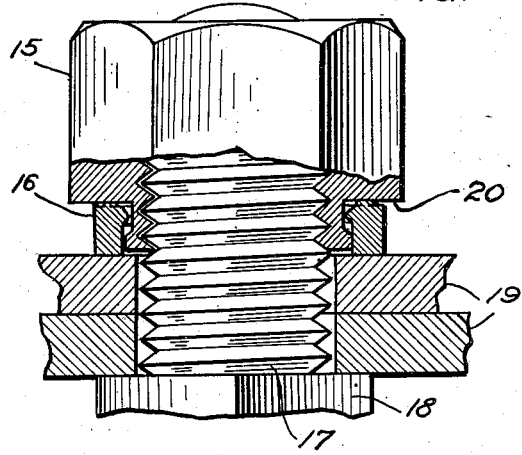
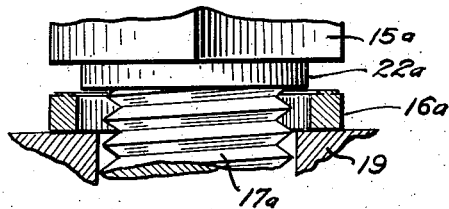
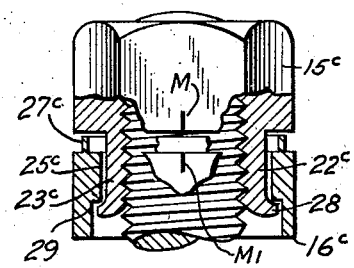
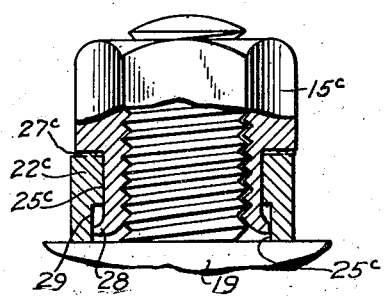
Inventor
LAWSON TARWATER
and
WENDELL R. McKENZIE
by Edwin D. Jones.
Attorney.

Patented Dec. 18, 1945

2,391,279

UNITED STATES PATENT OFFICE 2,391,279

LOCK NUT

Lawson Tarwater and Wendell R. McKenzie, Los Angeles, Calif., assignors of ten per cent to Six Wheels, Inc., Los Angeles, Calif., a corporation of California Application December 29, 1941, Serial No. 424,776

3 Claims. (Cl. 151—19)

Our invention relates to nut lock constructions of that character embodying two members superimposed on a bolt, and provided with cams coacting, when rotated relatively, to set up radial, lateral or transverse stresses between the members and the bolt, which operate to jam the members against the bolt and thus lock the members on the bolt.

Nut lock constructions of this character have been found to be faulty because the cams cannot be rotated relatively to lock or unlock the members without holding one of the members with a wrench while turning the other. Also, because the degree of eccentricity of the cams in relation to the depth of the bolt threads, the cams are rotatable relatively just to the 180 degree position and no further without effecting permanent distortion of the threads of the bolt and members, and in this position they do not remain when subjected to intense vibration, so that their locking effect is lost.

It is the purpose of our invention to provide a nut lock construction of the above described character, which has means associated with the two members by which the cams thereof may be rotated relatively to a 180 degree locked position and subsequently released by reverse rotation relatively, without the necessity of holding one of the members with a wrench while turning the other.

It is also purpose of our invention to provide a nut lock construction, wherein the eccentricity of the cams of the two members is designed in a predetermined ratio with respect to the depth of the threads of the bolt to which the members are applied. This ratio of cam eccentricity to thread depth, is such that the cams can be turned relatively, not only to, but beyond the 180 degree position without permanent distortion of any of the threads. By so doing that feature of our invention is produced of setting up a maximum transverse jamming action of one or both of the members, when the cams reach the 180 degree position, and maintaining this locking action in a lesser degree, when the cams pass the 180 degree position. Once the cams pass the 180 degree position any tendency of one or both of the members to unscrew, will be resisted positively by the high points of the cams, and, in practice it has been found that under vibration of the members and the bolt, any turning tendency is a screwing action to further advance the members inwardly on the bolt and thereby increase the clamping action of the members and bolt in respect to the plates or other work through which the bolt extends. Thus is produced a nut lock construction, which when once locked, not only operates to maintain the locking action, but further tightens the members on the bolt.

We will describe only two forms of nut lock constructions, each embodying our invention, and will then point out the novel features thereof in claims.

In the accompanying drawing:

Fig. 1 is a view showing in vertical section one form of nut lock construction embodying our invention.

Fig. 2 is a view, partly in section, showing our nut lock construction applied to a bolt and in locked position, with the bolt extending through the plates of a piece of work.

Fig. 3 is a view showing in elevation and partly in section another form of nut lock construction applied to a bolt, and where the lock nut and washer are in released position with respect to the bolt.

Fig. 4 is a view similar to Fig. 1, showing another form of lock nut construction embodying our invention and in applied position to a bolt.

Fig. 5 is a view similar to Fig. 4 and showing the same in nut-locking position as distinguished from the non-locking position shown in Fig. 4.

Similar reference characters refer to similar parts in each of the several views.

Referring first to Figs. 1 and 2, our invention in this embodiment comprises an interiorly threaded nut member, which may be in the form of a lock nut 15 having a lock member in the form of a lock washer 16 superimposed on the threaded shank 17 of a bolt 18 extended through plates 19 for holding the plates together.

At that side 20 of the lock nut 15 confronting the side 21 of the lock washer which, in the present instance, is the lower side, the lock nut is formed with a collar 22 which is interiorly threaded in continuation of the threads of the bore of the lock nut. The outer periphery of the collar 22, which is considerably inset from the outer and hexagonal periphery of the lock nut, is eccentric to both the bore of the nut and the collar, to provide an annular cam 23. This cam 23 extends the full height of the collar, although the collar is increased in thickness at its lower marginal end to form an annular shoulder 24 on the outer periphery thereof.

The lock washer 16, which is of the same outside dimensions as the lock nut 15, is likewise of hexagonal form, so that a single wrench may be employed to screw the lock nut on and off the bolt shank 17, and at the same time hold the lock washer in a fixed position circumferentially of the lock nut. The inner periphery of the lock washer is circular but eccentric to its outer periphery and to the same degree as the outer periphery of the collar 22, to provide thereon an eccentric annular cam 25. The two circles defining the two cams 23 and 25 are struck from the same center, and this center is offset with respect to the major axis A of the bolt shank, approximately $\frac{1}{32}$ of an inch where the lock nut and lock washer are designed for use on a one inch bolt having standard size threads. By this offsetting the eccentricity of the cams becomes about ¼ of the depth of the threads of the bolt, and this degree of eccentricity has been found to be suitable to permit turning of the lock nut relative to the lock washer, from a position in which the cams 23 and 25 are concentric one to the other, to a 180 degree position wherein the high points of the cams are opposed, and beyond this 180 degree position, without effecting permanent distortion of the threads of the nut, washer or bolt.

While the cam 25 extends the full height of the lock washer 16, the inner periphery of the washer is formed at its upper edge with an annular tongue 26 which, while allowing the requisite free axial movement of the collar 22 in the lock washer, coacts with the annular shoulder 24 to permanently confine the lock washer on the collar. The lock washer may be mounted on the collar by enlarging the inside diameter of the lock washer through the application of heat, while the outside diameter of the collar may be reduced by chilling the metal.

As shown in Fig. 1, the lock washer has formed on its side 21 an annular and upstanding flange 27 which is relatively thin so as to be crushed or mashed when pressure is applied edgewise thereto. This flange is one of numerous yieldable means which may be employed to normally and temporarily hold the lock nut spaced from the lock washer incident to moving the cams 23 and 25 relatively for locking the nut on the bolt.

In operation, before the nut 15 and washer 16 are applied to the bolt shank 17, they must be so positioned circumferentially that the cams 23 and 25 are concentric one to the other. This is facilitated through indication of the low points of the two cams 23 and 25, by forming marks M and M1 on the nut and the washer at such points. Such marks, however, are on the outer peripheries of the nut and washer, as illustrated in the form shown in Fig. 4.

With the cams concentrically positioned they are in what may be termed a neutral or non-locking position, so that the nut with the washer in advance thereof may be screwed readily onto the bolt. Here the side of the washer 16 abuts the face of the adjacent plate 19, while the nut side 20 comes into contact with the flange 27 to prevent it from turning with the nut.

Now by gripping only the nut and turning it in a clock-wise direction, the collar cam 23 is rotated first through an angle of 180 degrees and then beyond such angle, say for a distance from 10 to 15 degrees. As the cam 23 starts to rotate, the lock nut in moving down the bolt thread, exerts through the flange 27, a pressure axially of the washer, which operates to force the washer against the adjacent plate 19, and this binds the washer against turning on the plate. Thus, the washer cam 25 is locked against turning, and the cam 23 continues to turn to the 180 degree position in which its high point is opposed diametrically to the high point of the cam 25. This causes the cams to jam the nut and collar against the bolt, thereby producing a transverse stress to cause the threads of the nut and collar to have locking engagement with the threads of the bolt but without permanent distortion of either because of the aforedescribed ratio of cam eccentricity to thread depth.

Upon the collar cam 23 passing the 180 degree position, this transverse stress is lessened sufficiently to allow relatively free turning of the nut inwardly on the bolt, so that vibration of the nut will cause it to feed inwardly rather than outwardly, and thereby further tighten itself on the bolt.

The aforedescribed operation of our nut lock construction is made possible by the manner in which the flange 27 functions during such operation. This flange 27 may be of a height equal to or greater than the pitch of the thread of the nut, so that as the nut is turned down on the bolt the flange although progressively crushed, functions to resist the meeting of the nut side 20 with the washer side 21, until the collar cam 23 has rotated to and past the 180 degree position. Were it not for this function of the flange, the nut side 20 would abut and bind against the washer side 21 to the extent of causing the washer and its cam 25 to turn with the collar and its cam 23, and thus no effective locking action could be had.

To unscrew the nut, when required, sufficient turning force can be applied by a wrench to rotate the high point of the collar cam 23 backwardly past the high point of the washer cam 25, thereby unlocking the nut. This operation is facilitated by reason of the fact that the amount of crush of the flange 27 which takes place during the locking of the nut, is slightly less than the pitch of the nut thread, and thus the collar cam 23 will disengage the washer cam 25 in less than one turn of the nut, and thereby the possibility of the washer turning with the nut by reason of binding thereagainst, is eliminated. This mode of operation is best illustrated in Fig. 3, although in this form of our construction the washer indicated at 16a, the collar at 22a and the nut at 15a, are constructed so that the washer is unattached to the collar as distinguished from the permanent attachment of the washer to the collar as in Fig. 1.

Referring to Figs. 4 and 5, we have here shown another form of nut lock construction showing another method of permanently attaching the washer to the nut collar. Here the nut 15c is provided with a collar 22c which is relatively long and interiorly threaded. The free end of the collar is flanged outwardly to form an annular tongue 28. The washer 16c is relatively wide and is formed interiorly with an annular shoulder 29 which coacts with the tongue 28 to permanently attach the washer to the collar.

As in the first form of our invention, the washer 16c is provided with a flange 27c, while the collar and washer are provided with eccentric cam surfaces 23c and 25c. By a comparison of Figs. 4 and 5, it would be clear that this form of nut lock construction operates substantially in the same manner as that described in connection with the construction shown in Fig. 2. An advantage of the construction over the former, is that the collar and washer being longer and the eccentric cams wider the transverse stress set up extends a greater distance along the length of the bolt.

and thus, an increased locking action is secured.

We claim:

1. A lock nut comprising a threaded nut, one end of which terminates in a shoulder and a threaded collar, the periphery of the collar being circular and eccentric to the nut bore to form a cam surface; and a washer having a circular bore closely fitting and rotatably mounted on said collar, the washer having also an upstanding annular flange toward said shoulder which is adapted to be mashed down when the nut is threaded down on a bolt toward the work and against the washer.

2. A lock nut as defined in claim 1, in which the flange has a contact surface materially less than the reverse side of the washer.

3. A lock nut as defined in claim 1, in which the eccentricity of the cam surface is less than the depth of the thread of the bolt.

WENDELL R. McKENZIE.
LAWSON TARWATER.